(12) United States Patent
Vitanov

(10) Patent No.: US 11,262,641 B2
(45) Date of Patent: Mar. 1, 2022

(54) OVERHEATING PROTECTION FOR SENSOR HOUSING

(71) Applicant: Pony AI Inc., Grand Cayman (KY)

(72) Inventor: Anatolii Vitanov, Fremont, CA (US)

(73) Assignee: Pony AI Inc., Grand Cayman (KY)

(*) Notice: Subject to any disclaimer, the term of this patent is extended or adjusted under 35 U.S.C. 154(b) by 81 days.

(21) Appl. No.: 16/713,625

(22) Filed: Dec. 13, 2019

(65) Prior Publication Data

US 2021/0181606 A1 Jun. 17, 2021

(51) Int. Cl.
| | |
|---|---|
| *G03B 17/55* | (2021.01) |
| *G01D 11/24* | (2006.01) |
| *G01P 3/00* | (2006.01) |
| *H04N 5/225* | (2006.01) |
| *G01K 3/00* | (2006.01) |
| *G01L 19/14* | (2006.01) |
| *G01D 11/30* | (2006.01) |
| *G01D 11/26* | (2006.01) |
| *B60R 11/04* | (2006.01) |

(52) U.S. Cl.
CPC ............ *G03B 17/55* (2013.01); *G01D 11/24* (2013.01); *G01D 11/245* (2013.01); *G01D 11/26* (2013.01); *G01D 11/30* (2013.01); *G01K 3/005* (2013.01); *G01L 19/14* (2013.01); *G01P 3/00* (2013.01); *H04N 5/2252* (2013.01); *B60R 11/04* (2013.01)

(58) Field of Classification Search
CPC ...... G01D 11/14; G01D 11/245; G01D 11/30; G01D 11/26; G01L 19/14; G03B 17/55; G01K 3/005; G01P 3/00; H04N 5/2252; B60R 11/04

USPC ......................................................... 73/431
See application file for complete search history.

(56) References Cited

U.S. PATENT DOCUMENTS

| | | | | |
|---|---|---|---|---|
| 3,591,810 | A * | 7/1971 | Jackson ................. | G01K 11/16 250/472.1 |
| 3,597,977 | A * | 8/1971 | Zierak .................... | G01K 5/326 374/198 |
| 6,069,652 | A * | 5/2000 | Eversole .............. | H04N 5/2252 348/83 |
| 6,778,209 | B1 * | 8/2004 | Eversole .............. | H04N 5/2252 348/65 |
| 2018/0170316 | A1 * | 6/2018 | Park ...................... | G01N 21/45 |

(Continued)

*Primary Examiner* — Clayton E. LaBalle
*Assistant Examiner* — Kevin C Butler
(74) *Attorney, Agent, or Firm* — Sheppard Mullin Richter & Hampton LLP

(57) ABSTRACT

Described herein are apparatuses and methods for selectively controlling the application of a fluid to a sensor enclosure such as a camera housing to protect the housing from overheating. An apparatus that includes a protective shield and a conduit such as tubing for supplying a fluid is described. The protective shield is provided so as to protect an exterior surface of the camera housing from heat caused by sun exposure. The tubing includes an inlet for supplying a fluid such as water or air, can extend through or around an exterior of the camera housing, and includes an outlet with one or more nozzles for ejecting the fluid into a space between the protective shield and the camera housing. Sensor data is received from various vehicle sensors to assess the temperature of the housing, the velocity of the vehicle, and so forth to determine when the fluid should be supplied.

20 Claims, 5 Drawing Sheets

(56) References Cited

U.S. PATENT DOCUMENTS

2018/0231875 A1* 8/2018 Zanganeh ............ H04N 5/2252
2021/0024010 A1* 1/2021 Boswell ................ B60R 11/04

* cited by examiner

OVERHEATING PROTECTION FOR SENSOR HOUSING

The present invention relates generally to protecting a sensor housing from overheating, and more particularly, in some embodiments, to selectively controlling the application of a cooling fluid to a sensor housing to protect against overheating.

BACKGROUND

A vehicle, such as an autonomous vehicle (AV), includes a myriad of sensors that provide continuous streams of sensor data captured from the vehicle's surrounding environment. Such sensor data enables an AV to perform a number of functions that would otherwise be performed by a manual human operator including various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

A vehicle such as an AV can include a variety of different types of on-board sensors including, for example, cameras, light detection and ranging (LiDAR) systems, radar systems, Global Positioning System (GPS) devices, sonar-based sensors, ultrasonic sensors, accelerometers, gyroscopes, magnetometers, inertial measurement units (IMUs), and far infrared (FIR) sensors. On-board vehicle sensors disposed on an exterior of a vehicle may be provided in or integrated with protective housing to protect the sensors from damage from the elements. Conventional sensor housing, however, suffers from a number of technical drawbacks relating to environmental factors that can diminish the housing's ability to protect the sensors that it encloses. Technical solutions that address these technical drawbacks are described herein.

SUMMARY

In an example embodiment, an apparatus for protecting a sensor housing from overheating includes a first component configured to reduce heat exposure for an exterior surface of the sensor housing and a second component configured to supply a fluid to a space between the first component and the exterior surface of the sensor housing. In an example embodiment, the fluid is air or water. In an example embodiment, the first component is a protective shield that protects the exterior surface of the sensor housing from direct sun exposure. In an example embodiment, the second component is a tube that has an inlet at one end for receiving the fluid and one or more nozzles at an opposing end for ejecting the fluid into the space between the first component and the exterior surface of the sensor housing.

In an example embodiment, the one or more nozzles are adjustable to direct the fluid to different portions of the exterior surface of the sensor housing. In an example embodiment, the tube extends through an interior of the sensor housing. In another example embodiment, the tube extends around an exterior of the sensor housing.

In an example embodiment, the sensor housing encloses one or more cameras and includes one or more corresponding transparent surfaces to provide the one or more cameras with a field-of-view of an external environment.

In an example embodiment, the apparatus for protecting a sensor housing from overheating further includes one or more drainage channels for directing the fluid (e.g., water) supplied to the space between the first component and the exterior surface of the sensor housing away from the one or more transparent surfaces. In an example embodiment, the one or more drainage channels are formed in the exterior surface of the sensor housing.

In an example embodiment, the apparatus further includes a controller configured to selectively supply the fluid to the space between the first component and the exterior surface of the sensor housing based at least in part on a temperature of or around the sensor housing and a velocity of a vehicle in connection with which the apparatus is provided.

In an example embodiment of the invention, a computer-implemented method for selectively controlling an apparatus for protecting a sensor housing from overheating includes receiving sensor data and analyzing the sensor data to determine a level of vulnerability of the sensor housing to overheating. The method further includes determining that the level of vulnerability exceeds a threshold level and controlling the apparatus to supply a fluid to lower a temperature of the sensor housing. In an example embodiment, sensor data includes at least one of temperature data or velocity data for a vehicle.

In an example embodiment, the apparatus selectively controlled by the computer-implemented method includes a first component configured to reduce heat exposure for an exterior surface of the sensor housing and a second component configured to supply the fluid to a space between the first component and the exterior surface of the sensor housing. In an example embodiment, the first component is a protective shield that protects the exterior surface of the sensor housing from direct sun exposure and the second component is a tube that has an inlet at one end for receiving the fluid and one or more nozzles at an opposing end for ejecting the fluid into the space between the protective shield and the exterior surface of the sensor housing.

In an example embodiment, controlling the apparatus includes sending a control signal to initiate the intake of the fluid at the inlet of the tube. In an example embodiment, controlling the apparatus further includes adjusting the one or more nozzles to direct to the fluid to different portions of the exterior surface of the sensor housing.

In an example embodiment, analyzing the sensor data to determine the level of vulnerability of the sensor housing to overheating includes determining a temperature of the sensor housing based at least in part on the temperature data and determining that the temperature exceeds a threshold temperature. Analyzing the sensor data further includes determining, based at least in part on the velocity data, that a velocity of the vehicle is below a threshold velocity and determining the level of vulnerability of the sensor housing to overheating based at least in part on the temperature exceeding the threshold temperature and the velocity of the vehicle being below the threshold velocity.

In an example embodiment, the temperature of the sensor housing is a first temperature during a first period of time, and the computer-implemented method further includes determining a second temperature of the sensor housing during a second period of time based at least in part on the temperature data, determining that the second temperature is below the threshold temperature, determining, based at least in part on the second temperature being below the threshold temperature, that the level of vulnerability of the sensor housing to overheating is below the threshold level, and controlling the apparatus to cease the supply of the fluid.

In an example embodiment, the velocity of the vehicle is a first velocity of the vehicle during a first time period, and the computer-implemented method further includes determining a second velocity of the vehicle during a second period of time based at least in part on the velocity data, determining that the second velocity of the vehicle is above the threshold velocity, determining, based at least in part on the second velocity of the vehicle being above the threshold velocity, that the level of vulnerability of the sensor housing to overheating is below the threshold level, and controlling the apparatus to cease the supply of the fluid.

In an example embodiment, the sensor data includes environmental moisture data, and the computer-implemented method further includes determining, based at least in part on the environmental moisture data, an amount of moisture on the sensor housing, determining that the amount of moisture exceeds a threshold amount of moisture, determining, based at least in part the amount of moisture exceeding the threshold amount of moisture, that the level of vulnerability of the sensor housing to overheating is below the threshold level, and controlling the apparatus to cease the supply of the fluid.

In another example embodiment of the invention, a system for selectively controlling an apparatus for protecting a sensor housing from overheating includes at least one processor and at least one memory storing computer-executable instructions. The at least one processor is configured to access the at least one memory and execute the computer-executable instructions to perform a series of operations. In an example embodiment, the series of operations includes any of the steps/features of any of the above-described methods.

In another example embodiment of the invention, a computer program product for selectively controlling an apparatus for protecting a sensor housing from overheating is disclosed. The computer program product includes a non-transitory computer-readable medium readable by a processing circuit, where the non-transitory computer-readable medium stores instructions executable by the processing circuit to cause any of the above-described methods to be performed.

In example embodiments, any of the above-described features/aspects can be implemented in any combination in connection with any of the above-described apparatuses, methods, systems, or computer-readable media.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
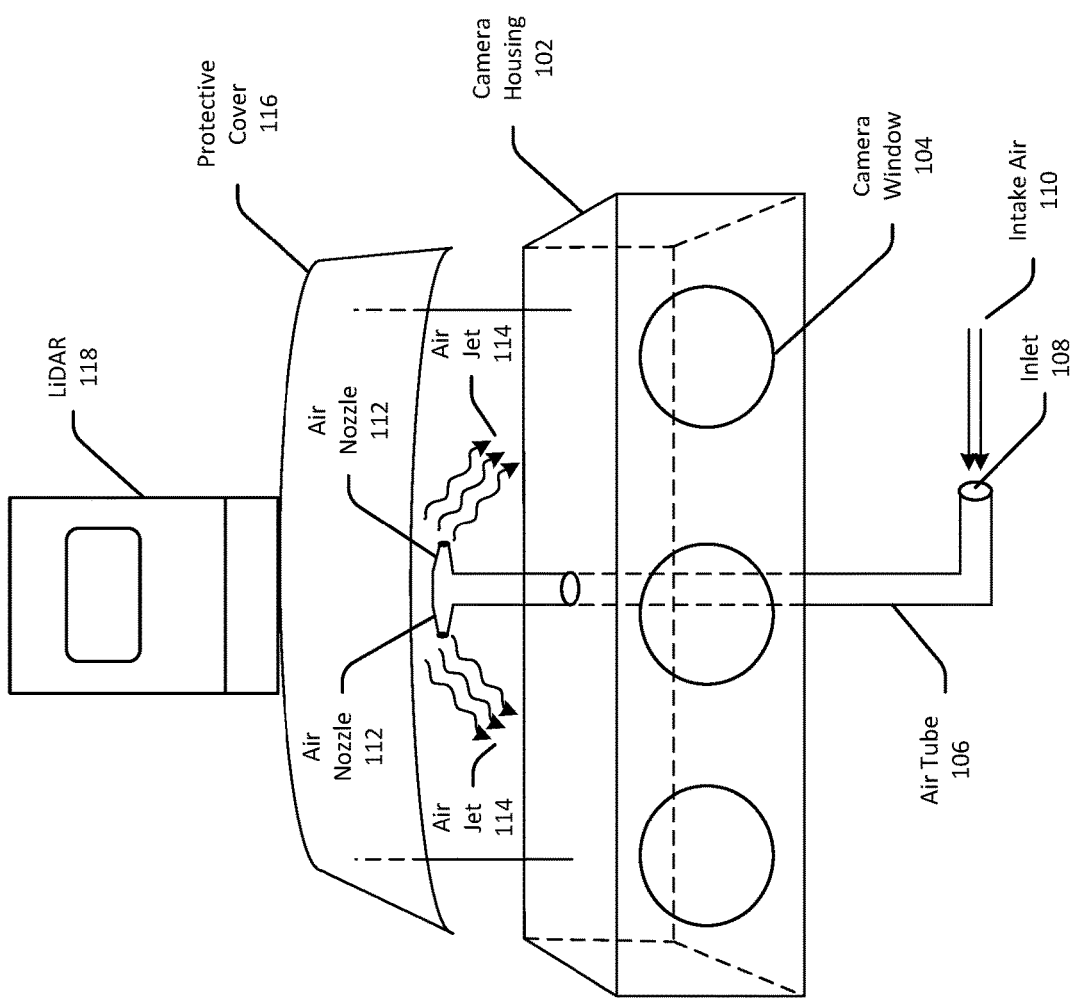
FIG. 1 schematically illustrates an overheating protection apparatus in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "includes," "including," "contains," or "containing" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents and vice versa unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Described herein are apparatuses, methods, systems, and non-transitory computer readable media for protecting a sensor housing from overheating. A vehicle such as an AV may be equipped with a variety of different types of sensors. These sensors are configured to capture sensor data that can be used to facilitate various vehicle operational functions such as vehicle navigation, vehicle acceleration and braking, and so forth. Certain types of sensors such as cameras may be enclosed in a housing that protects the sensors from damage that could result from exposure to environmental elements such as heat, dust, wind, rain, snow, or the like. While a camera housing, for example, may offer protection from the elements, it is also susceptible to overheating due to sun exposure. If a camera housing becomes too hot, potential damage to and disruption of the functionality of cameras contained in the housing may occur.

Example embodiments of the invention relate, among other things, to apparatuses configured to supply a cooling fluid such as air or water to one or more exterior surfaces of a sensor housing such as a camera housing to cool the housing and prevent overheating. An overheating protection apparatus in accordance with an example embodiment of the invention includes a first component configured to reduce heat exposure for an exterior surface of a sensor housing and a second component configured to supply a fluid to cool the sensor housing. More specifically, the first component may be a protective shield or the like disposed so as to prevent at least one exterior surface of the sensor housing from receiving direct sun exposure. The second component may be a tube having an inlet at one end capable of receiving an intake fluid and an outlet at an opposing end for supplying the fluid to a space between the first component (e.g., a protective shield) and an exterior surface of the sensor housing. One or more nozzles may be provided at the outlet end for adjustably directing the flow of the fluid to different portions of the exterior surface of the sensor housing.

Overheating protection apparatuses in accordance with example embodiments of the invention provide a technological improvement that addresses the technical problem of susceptibility of sensor housing to overheating. In particular, overheating protection apparatuses in accordance with example embodiments of the invention reduce a sensor housing's susceptibility to overheating at least in part by providing a protective shield, cover, or the like that prevents at least one exterior surface of the sensor housing from direct exposure to heat from the sun's rays, for example. Further, overheating protection apparatuses in accordance with example embodiments of the invention further reduce a sensor housing's susceptibility to overheating by supplying a cooling fluid to a space between the protective shield/cover and an exterior surface of the sensor housing. The cooling fluid serves to further reduce the temperature of the sensor housing to prevent overheating.

Example embodiments of the invention also relate, among other things, to computer-implemented methods for selectively controlling overheating protection apparatuses described herein and to corresponding systems and computer-readable media for implementing such methods. In example embodiments, a computer-implemented method for selectively controlling an overheating protection apparatus according to example embodiments of the invention includes receiving sensor data, analyzing the sensor data to determine a level of vulnerability of the sensor housing to overheating, determining that the level of vulnerability exceeds a threshold level, and controlling the apparatus to supply a fluid to lower a temperature of the sensor housing. As previously described, the overheating protection apparatus may include a protective shield/cover that prevents at least one exterior surface of the sensor housing from direct sun exposure as well as a conduit/fluid line (e.g., a tube) adapted to receive intake fluid at one end and eject the fluid from an opposing end into a space between the protective shield/cover and an exterior surface of the sensor housing.

In example embodiments, the apparatus may be disposed on an exterior of a vehicle such as an AV and the sensor data may include temperature data and/or vehicle velocity data. In example embodiments, the analysis of the sensor data to determine a level of vulnerability of the sensor housing to overheating may include determining, from the sensor data, various parameters relating to heat susceptibility and determining the level of vulnerability of the sensor housing to overheating based on such parameters. For instance, in example embodiments, a temperature of or around the sensor housing may be determined from the temperature data and a velocity/speed of the vehicle on which the sensor housing is provided may be determined. As used herein, the term velocity may refer to the scalar quantity speed (i.e., the magnitude of the velocity) or to the velocity vector that includes both speed and direction.

In some example embodiments, the application of the cooling fluid to the sensor housing may be selectively controlled based on the interplay between the temperature and velocity parameters. For instance, in some example embodiments, the computer-implemented method for selectively controlling an overheating protection apparatus may initiate the supply of the cooling fluid to the sensor housing if both of the following conditions are met: 1) the temperature exceeds a threshold temperature, and 2) the vehicle velocity is below a threshold velocity. More specifically, if both of these conditions are met, the level of vulnerability of the sensor housing to overheating may be high because the vehicle velocity may not produce enough circulating air to cool the high temperature of the sensor housing. As such, in this example scenario, the level of vulnerability of the sensor housing to overheating may exceed a threshold level of vulnerability, thereby triggering a control signal to be sent to initiate the intake of a cooling fluid to the apparatus and the supply of the cooling fluid by the apparatus to at least one exterior surface of the sensor housing.

In other example embodiments, only one of the conditions identified above may need to be met to trigger the overheating protection apparatus to supply the cooling fluid. For instance, even if the vehicle velocity is not below the threshold velocity, the cooling fluid may be supplied as long as the temperature associated with the sensor housing exceeds the threshold temperature. Similarly, in some example embodiments, even if the temperature is below the threshold temperature, the cooling fluid may be supplied as long as the vehicle velocity is below the threshold velocity. In still other example embodiments, if only one of the above-described conditions is met, the deviation between the corresponding parameter and the threshold value may need to exceed a certain value in order for the apparatus to be triggered to supply the cooling fluid. For instance, in some example embodiments, if the vehicle velocity is above the threshold velocity, the temperature of the sensor housing may need to exceed the threshold temperature by more than a predetermined value (or vice versa) before the cooling fluid is supplied.

Computer-implemented methods for selectively controlling the supply of a cooling fluid to a sensor housing provide a technological improvement by first assessing a sensor housing's susceptibility to overheating based on various environmental or operational parameters, and then only triggering an overheating protection apparatus to supply the cooling fluid to the sensor housing when the environmental/operational parameters indicate a high level of susceptibility to overheating. By restricting the supply of the cooling fluid to scenarios in which the sensor housing is highly susceptible to overheating, the overheating protection apparatus operates in an energy-efficient manner that optimizes the energy expenditure of the apparatus, and thus, constitutes a technological improvement.

Referring now to FIG. 1, a camera housing 102 is depicted in conjunction with an overheating protection apparatus adapted to provide overheating protection to the camera housing 102 in accordance with an example embodiment of the invention. The camera housing 102 may house (i.e., enclose) one or more cameras. The camera housing 102 may include one or more transparent surfaces (e.g., camera window 104) on one or more exterior surfaces of the camera housing 102. The cameras contained in the camera housing 102 are provided with a field-of-view of an environment external to the camera housing 102 via the transparent surfaces. For instance, the camera housing 102 may be provided on an exterior of a vehicle such as an AV, and the cameras may take images of the vehicle's surrounding environment, as viewed through the camera windows 104. The images may be processed for a variety of purposes such as object classification, object tracking, or the like.

Still referring to FIG. 1, the overheating protection apparatus may include a first component in the form of a protective cover/shield 116. The protective shield 116 may be disposed so as to substantially overlap with an exterior surface of the camera housing 102. In this manner, the protective shield 116 may provide heat protection for the camera housing 102 by preventing an exterior surface of the camera housing 102 from being directly exposed to a source of heat such as the sun's rays. In example embodiments, the protective shield 116 may have a convex shape to protect the exterior surface of the camera housing 102 from a wider range of angles of impingement of the sun's rays. The protective shield 116 may be formed from any of a variety of suitable materials including, but not limited to, any materials that are poor heat conductors. In example embodiments, the protective shield 116 may be coupled to the camera housing 102 via one or more mechanical couplings or connections. In other example embodiments, the protective shield 116 may be coupled to another structure (e.g., the vehicle body or another sensor housing), but in a manner that provides protection from heat exposure for an exterior surface of the camera housing 102.

The overheating protection apparatus may further include a fluid line (e.g., a tube 106) through which intake air 110 can be supplied to an exterior surface of the camera housing 102 in order to cool the housing 102. More specifically, the tube 106 may include an inlet 108 at one end via which the intake air 110 can be supplied to the tube 106. In example embodiments, the intake air 110 may be sourced from recirculated vehicle cabin air, may be produced by an air blower, or the like. For example, air conditioned cold air from the vehicle cabin can be recirculated and used as the source of the intake air 110. In example embodiments, the intake air 110 may be supplied to the inlet 108 of the tube 106 with enough pressure to cause the air to travel through the tube 106 and be ejected from an opposing end of the tube 106. In some example embodiments, the tube 106 may extend through an interior of the camera housing 102. This may be done for design reasons such as to reduce the amount of space required by the overheating protection apparatus. Despite extending through an interior of the camera housing 102, the tube 106 may serve as a barrier between the air therein and other internal components of the camera housing 102 (e.g., the cameras). In other example embodiments, the tube 106 may extend around the camera housing 102 and not through the interior of the housing 102.

In example embodiments, the tube 106 may be fitted with one or more nozzles or vents 112 adapted to eject the air from the tube 106 onto an exterior surface of the camera housing 102. In particular, in example embodiments, the protective shield 116 may be provided such that a space is present between the shield 116 and the exterior surface of the camera housing 102 that the shield 116 protects from heat exposure. The air may then be ejected from the tube 106 by the nozzles 112 as one or more air jets 114 into the space between the shield 116 and the exterior surface of the camera housing 102. The air jets 114 may be jets of pressurized cooled air. In this manner, an additional layer of overheating protection for the camera housing 102 is provided by the air jets 114 beyond the protection provided by the protective shield 116. Moreover, the protective shield 116 being provided in such a manner that a volume of space exists between the shield 116 and an exterior surface of the camera housing 102 allows for the air to be injected into the space and provide a further cooling effect on the camera housing 102. In some example embodiments, the nozzles 112 may be adjustable such that the ejected air can be directed to different portions of the exterior surface of the camera housing 102 as desired. In this manner, it can be ensured that the entire exterior surface of the camera housing 102 is cooled with the ejected air.

While not depicted in FIG. 1, one or more additional exterior surfaces of the camera housing 102 may be protected from heat exposure by the protective 116 shield and/or by one or more additional protective covers/shields. For instance, in an example embodiment, the protective shield 116 may extend over the sides of the camera housing 102 so as to provide protection from heat exposure to at least a portion of one or more side surfaces of the camera housing 102. Further, in some example embodiments, cooled air may be provided to one or more side surfaces of the camera housing 102 as well. For example, additional fluid lines may be provided that extend from the portion of the tube 106 shown as extending above the top exterior surface of the camera housing 102 to the side surfaces of the camera housing 102. These additional fluid lines may be fitted with one or more nozzles at an outlet end, which are adapted to eject air onto the side surfaces of the camera housing 102.

Further, in example embodiments, other sensors (e.g., LiDAR 118) may be provided as part of a suite of sensors that includes the cameras contained in the camera housing 102. In some cases, a sensor or sensor system may not be as susceptible to overheating as, for example, the camera housing 102 may be. This may be due to inherent characteristics of the sensor, its location in relation to potential heat sources, or the like. In other cases, such as with a LiDAR system, the sensor system may be equipped with its own temperature control mechanism. For instance, a LiDAR system—which inherently produces heat in order to send out light pulses—may be equipped with a thermoelectric temperature control mechanism to ensure temperature stability and prevent overheating. Temperature control is particularly important in LiDAR systems because changes in temperature can produce changes in the wavelength of light, and thus, potentially inaccurate frequency measurements.

Figure 2:
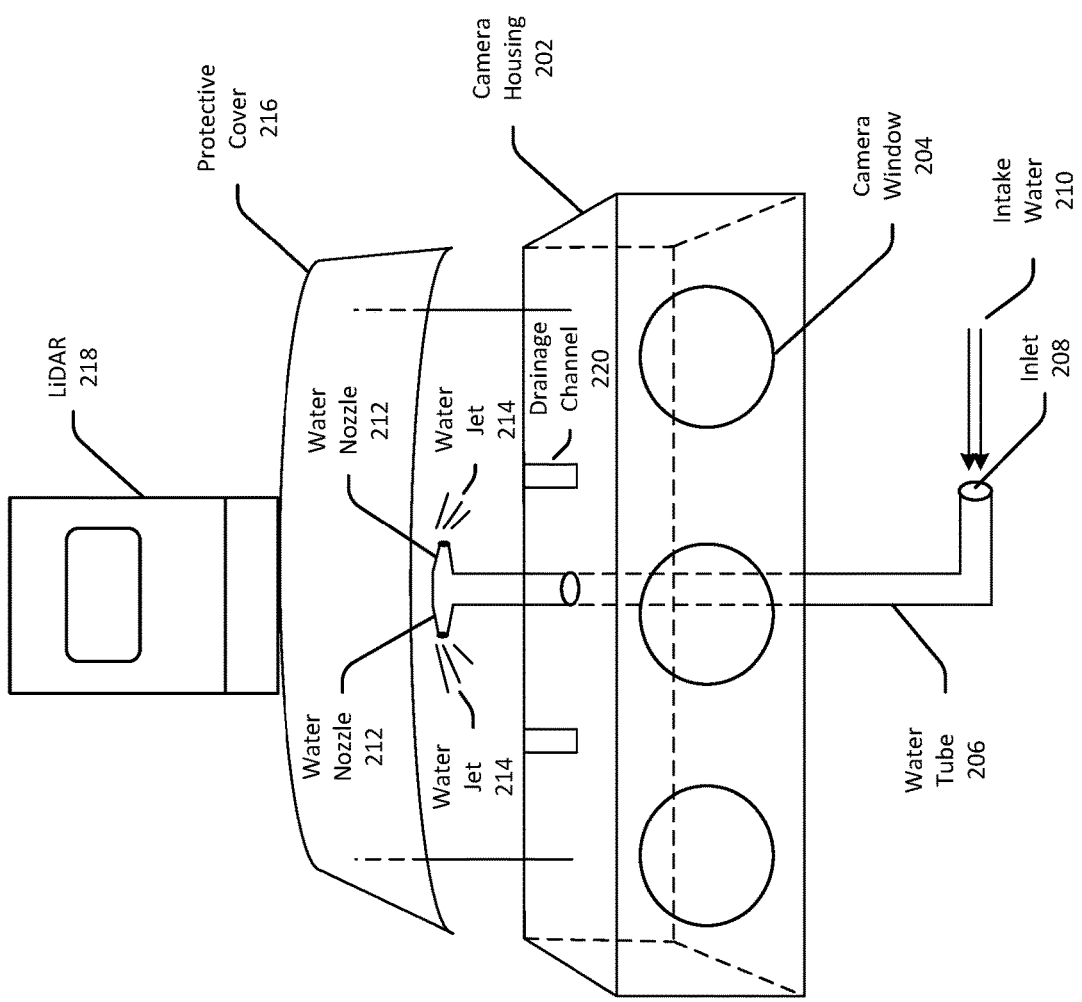
FIG. 2 schematically illustrates an overheating protection apparatus in accordance with another example embodiment of the invention.

Referring now to FIG. 2, a camera housing 202 is shown in conjunction with an overheating protection apparatus in accordance with another example embodiment of the invention. Similar to the camera housing 102 depicted in FIG. 1, the camera housing 202 may house one or more cameras (not shown) which may be provided with a field-of-view of an external environment through one or more transparent surfaces (e.g., camera windows 204) formed in one or more surfaces of the camera housing 202. In example embodiments, a variety of other types of sensors/sensor systems may also be provided to capture other types of sensor data. For example, various LiDAR systems 218 may be provided to detect surrounding objects. The LiDAR may be used in conjunction with the image data from the cameras housed in the camera housing 202 to provide object detection and classification functionality which, in turn, may help enable autonomous vehicle navigation, for example.

In the example embodiment of FIG. 2, the overheating protection apparatus includes a first component in the form of a protective cover/shield 216. Similar to the protective shield 116 of FIG. 1, the protective shield 216 may be disposed so as to substantially overlap with an exterior surface of the camera housing 102. In this manner, the protective shield 216 may provide heat protection for the camera housing 202 by preventing an exterior surface of the camera housing 102 from being directly exposed to a source of heat such as the sun's rays. The protective shield 216 may be coupled to the camera housing 202 via one or more mechanical couplings or connections or to another structure.

The overheating protection apparatus depicted in FIG. 2 further includes a fluid line (e.g., a tube 206) through which intake water 210 can be supplied to an exterior surface of the camera housing 202 in order to cool the housing 202. More specifically, the tube 206 may include an inlet 208 at one end via which the intake water 210 can be supplied to the tube 206. The intake water 210 may be sourced from cooled water from the radiator of a vehicle, for example. In example embodiments, the intake water 210 may be supplied to the inlet 208 of the tube 206 with enough pressure to cause the water to travel through the tube 206 and be ejected from an opposing end of the tube 206. In some example embodiments, a valve may be provided at the inlet 208 end to control the intake of the water 210. Similarly, a valve may be provided at an outlet end of the tube 206 to control the outflow of the water 210. In some example embodiments, the tube 206 may extend through an interior of the camera housing 102. In other example embodiments, the tube 206 may extend around the camera housing 202 and not through the interior of the housing 202. Whether the tube 206 extends through an interior of the camera housing 202 or around the housing 202 may be based on similar design considerations as discussed in reference to FIG. 1.

In example embodiments, the tube 206 may be fitted with one or more nozzles 212 adapted to eject the water from the tube 206 onto an exterior surface of the camera housing 202. In particular, in example embodiments, the protective shield 216 may be provided such that a space is present between the shield 216 and the exterior surface of the camera housing 202 that the shield 216 protects from heat exposure. The water may then be ejected from the tube 206 by the nozzles 212 as one or more water jets 214 into the space between the shield 216 and the exterior surface of the camera housing 202. In this manner, an additional layer of overheating protection for the camera housing 202 is provided by the water jets 214 beyond the protection provided by the protective shield 216. In some example embodiments, the nozzles 212 may be adjustable such that the ejected water can be directed to different portions of the exterior surface of the camera housing 202 as desired. In this manner, it can be ensured that the entire exterior surface of the camera housing 202 is cooled with the ejected water.

In example embodiments, one or more drainage channels 220 may be provided as part of the overheating protection apparatus. The drainage channels may be applied or affixed to an exterior surface of the camera housing 202 (e.g., the same exterior surface on which the water 210 is ejected as water jets 214). Alternatively, the drainage channels 220 may be integrally formed within the exterior surface of the camera housing 202. The drainage channels 220 may serve to channel the ejected water away from the camera windows 204 so that the windows do not become obscured with liquid droplets or the like and the field-of-view of the cameras contained in the camera housing 202 is maintained.

Figure 3:
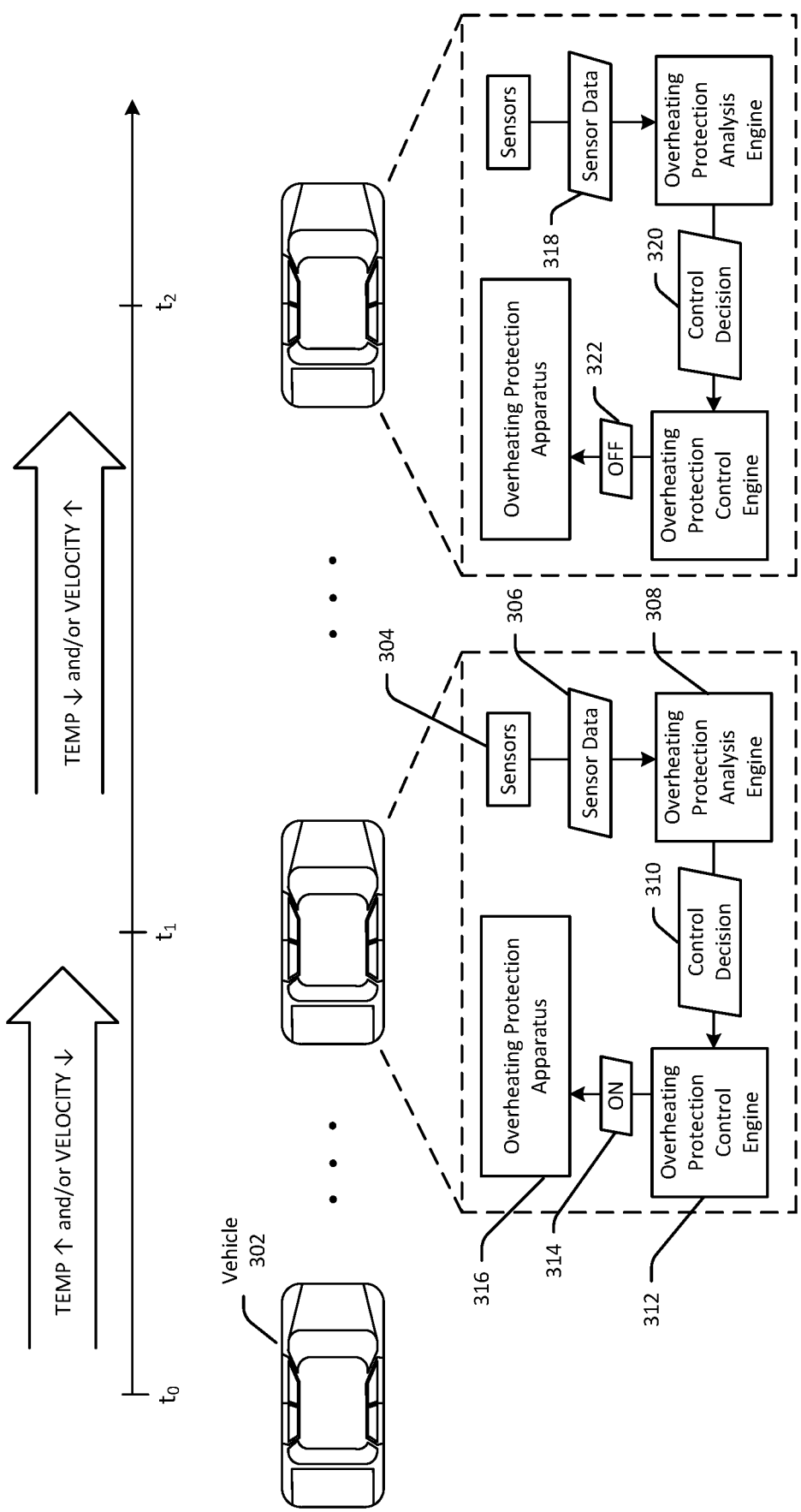
FIG. 3 schematically illustrates selective control of an overheating protection apparatus based on an analysis of sensor data in accordance with an example embodiment of the invention.
Figure 4:
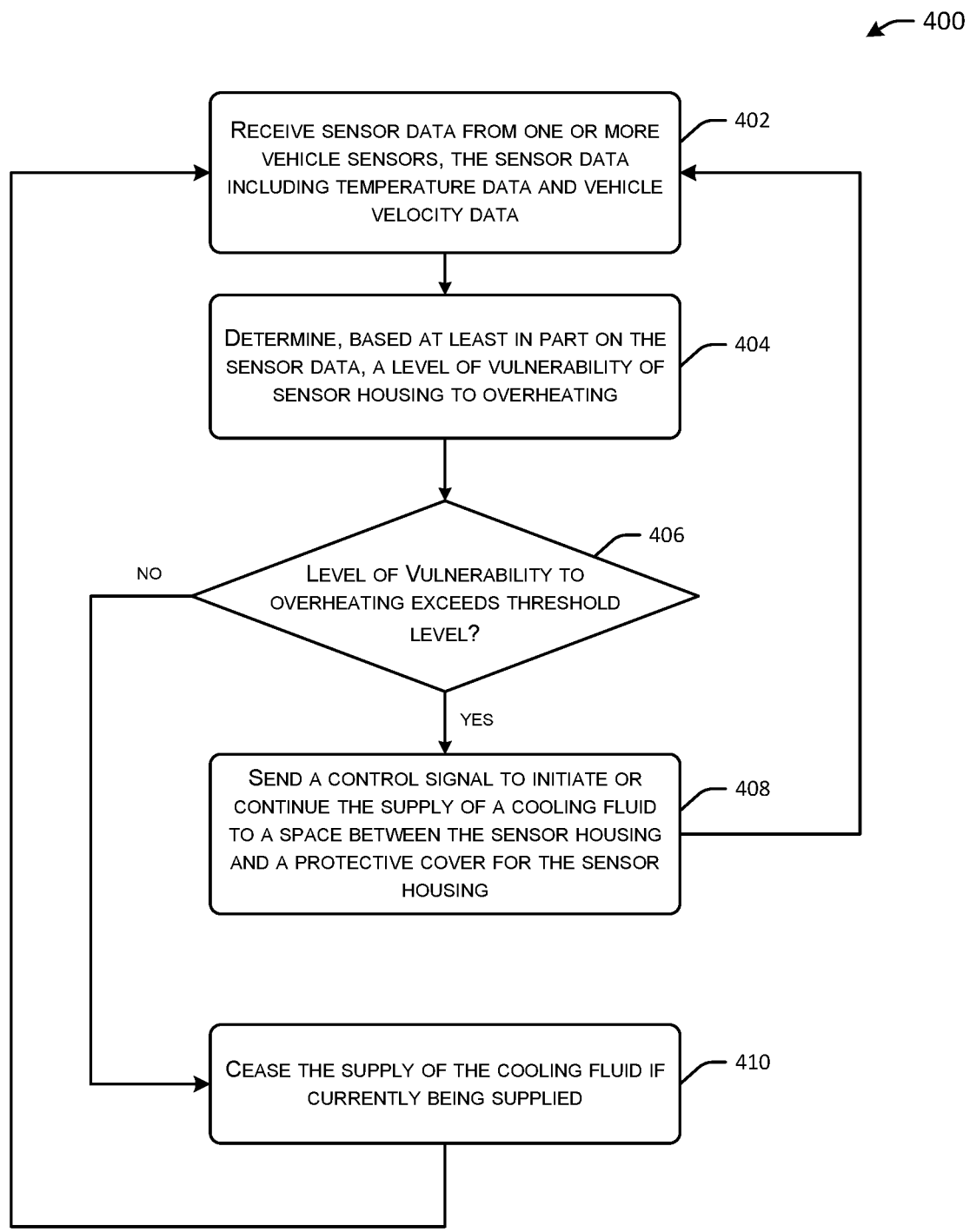
FIG. 4 is a process flow diagram of an illustrative method for selectively controlling an overheating protection apparatus based on an analysis of sensor data in accordance with an example embodiment of the invention.

FIG. 4 is a process flow diagram of an illustrative method 400 for selectively controlling an overheating protection apparatus based on an analysis of sensor data in accordance with an example embodiment of the invention. FIG. 3 schematically illustrates selective control of an overheating protection apparatus based on an analysis of sensor data in accordance with an example embodiment of the invention. FIGS. 3 and 4 will be described in conjunction with one another hereinafter.

Figure 5:
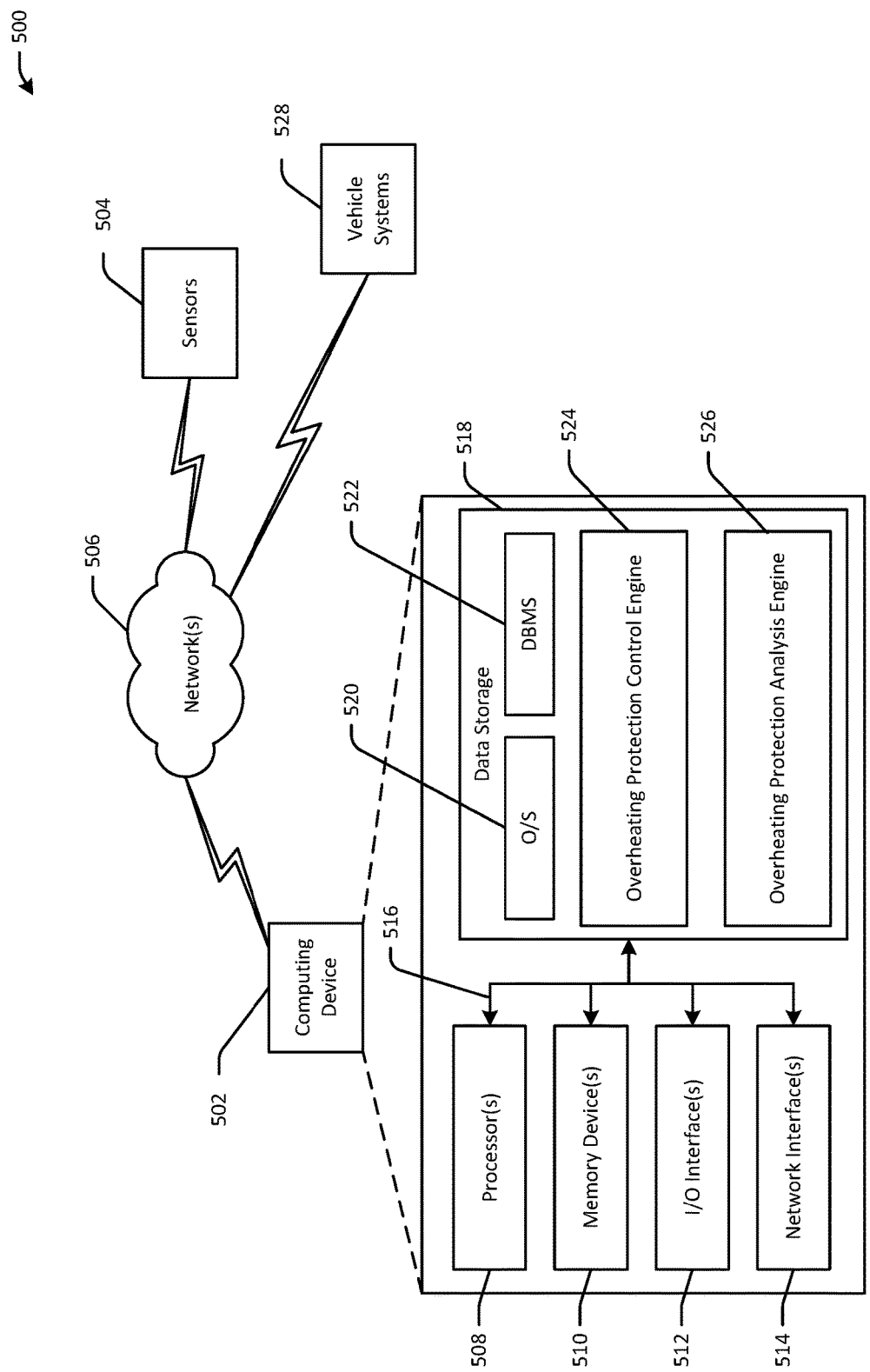
FIG. 5 is a schematic block diagram illustrating an example networked architecture configured to implement example embodiments of the invention.

Each operation of the method 400 can be performed by one or more of the engines depicted in FIG. 3 or in FIG. 5. These engines can be implemented in any combination of hardware, software, and/or firmware. In certain example embodiments, one or more of these engines can be implemented, at least in part, as software and/or firmware modules that include computer-executable instructions that when executed by a processing circuit cause one or more operations to be performed. In example embodiments, these engines may be customized computer-executable logic implemented within a customized computing chip such as an FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring now to FIG. 4 in conjunction with FIG. 3, the method 400 may be performed to selectively control the operation of an overheating protection apparatus 316 in accordance with example embodiments of the invention. The overheating protection apparatus 316 may be, for example, either of the overheating protection apparatuses depicted in FIG. 1 or FIG. 2. In example embodiments, the overheating protection apparatus 316 may be disposed on an exterior of a vehicle 302, which may be an AV. A variety of types of sensors and sensor systems 304 may also be provided on an exterior of the vehicle 302 such as cameras, LiDAR systems, radar systems, and so forth. In example embodiments, cameras may be housed in camera housings such as those depicted in FIGS. 1 and 2.

At block 402 of the method 400, an overheating protection analysis engine 308 may receive sensor data 306 from the sensors 304 at time $t_1$. As an example scenario, the vehicle 302 may be traveling along for a period of time between $t_0$ and $t_1$. During this time period, various fluctuations in temperature of or around a sensor housing such as a camera housing may occur. Further, fluctuations in the velocity of the vehicle 302 may also occur. In particular, as a non-limiting example, the temperature of or around a camera housing may increase (from sun exposure for example) and/or the velocity of the vehicle 302 may decrease (the vehicle 302 is in slow traffic or has come to a stop for example).

The sensor data 306 received at block 402 may reflect data instantaneously captured by the sensors 304 at $t_1$ or captured over some portion of the time period between $t_0$ and $t_1$. The sensor data 306 may include temperature data received from, for example, a temperature sensor, and/or vehicle velocity data received from, for example, an IMU, accelerometer, or the like. The sensors 304 may further include any of variety of different types of sensors such as LiDAR systems, radar systems, ultrasonic sensors, or the like. In addition to temperature data and velocity data, the sensor data 306 may also include any of variety of other types of data including, without limitation, time-of-flight data, frequency data, infrared data, or the like.

At block 404 of the method 400, the overheating protection analysis engine 308 may determine, based at least in part on the sensor data 306, a level of vulnerability of a camera housing to overheating. While example embodiments may be described herein in connection with overheating protection of a camera housing, it should be appreciated that embodiments of the invention can be configured to provide overheat protection to any protective housing or casing for any type of sensor or other component. At block 406 of the method 400, the overheating protection analysis engine 308 may determine whether the level of vulnerability of the camera housing to overheating exceeds a threshold level.

In response to a negative determination at block 406, the method 400 may proceed to block 410, where supply of the cooling fluid may be halted if it is currently being supplied. From block 410, the method 400 may proceed iteratively from block 402, where additional sensor data is received for analysis at block 404. In response to a positive determination at block 406, on the other hand, the overheating protection analysis engine 310 may send a control decision 310 to the overheating protection control engine 312. The control decision 310 may indicate to the overheating protection control engine 312 whether the supply of water or air (or any other suitable cooling fluid) to an exterior surface of the camera housing should be initiated from the overheating protection apparatus 316.

In response to a control decision 310 indicating that the supply of the cooling fluid should be initiated, the overheating protection control engine 312 may send an ON control signal 314 to initiate the supply of the cooling fluid. Referring, for explanatory purposes, to the overheating protection apparatus depicted in FIG. 1, in some example embodiments, the ON control signal 314 may trigger the opening of a valve at an inlet 108 of the tube 106 to allow the intake air 110 to flow through the tube 106 and be ejected from the nozzles 112 at an opposing end of the tube 106 as jets of air 114 onto an exterior surface of the camera housing 102. In other example embodiments, intake air 110 may be present under pressure in the tube 106, and the ON control signal 314 may trigger the opening of a valve at the outlet end to allow the intake air 110 to reach the nozzles 112 and be ejected as air jets 114 onto the exterior surface of the camera housing 102. In other example embodiments, the ON control signal 314 may simply trigger the operation of the nozzles to eject the air.

In example embodiments, the analysis of the sensor data 306 at block 404 to determine a level of vulnerability of the camera housing to overheating may include determining, from the sensor data 306, various parameters relating to heat susceptibility and determining the level of vulnerability of the camera housing to overheating based on the relationship of those parameters to various threshold levels/values. For instance, in example embodiments, the overheating protection analysis engine 308 may determine a temperature of or around the camera housing from the temperature data and a velocity/speed of the vehicle 302 from the velocity data. In some example embodiments, the application of a cooling fluid to an exterior surface of a camera housing may be selectively controlled based on the interplay between the temperature and velocity parameters. For instance, in some example embodiments, the overheating protection analysis engine 308 determines, at block 406, that the level of vulnerability of the camera housing to overheating exceeds the threshold level if both of the following conditions are met: 1) the temperature exceeds a threshold temperature, and 2) the vehicle velocity is below a threshold velocity. It should be appreciated that any discussion herein of a first value exceeding a second value also encompasses the first value being greater than or equal to the second value. Similarly, it should be appreciated that any discussion herein of a first value being below or less than a second value also encompasses the first value being less than or equal to the second value.

More specifically, if both of these conditions are met, the level of vulnerability of the camera housing to overheating may be high because the vehicle velocity may not produce enough circulating air external to the vehicle 302 to cool the high temperature of the camera housing. As such, in this example scenario, the overheating protection analysis engine 308 may determine that the level of vulnerability of the camera housing to overheating exceeds a threshold level of vulnerability at block 406, and may, as a result, send the control decision 310 to the overheating protection control engine 312, thereby triggering the overheating protection control engine 312 to send the control signal 314 to initiate, for example, the intake of a cooling fluid to the overheating protection apparatus 316 to enable it to be ejected from the apparatus 316 onto at least one exterior surface of the camera housing. Alternatively, the control signal 314 may trigger the ejection of cooling fluid already present in the apparatus 316 onto the exterior surface of the camera housing.

In other example embodiments, only one of the conditions identified above may need to be met to trigger the overheating protection apparatus 316 to supply the cooling fluid. For instance, even if the vehicle velocity is not below the threshold velocity, the cooling fluid may be supplied as long as the temperature associated with the camera housing exceeds the threshold temperature. Similarly, in some example embodiments, even if the temperature is below the threshold temperature, the cooling fluid may be supplied as long as the vehicle velocity is below the threshold velocity. In still other example embodiments, if only one of the above-described conditions is met, the deviation between the corresponding parameter and the threshold value may need to exceed a certain value in order for the apparatus 316 to be triggered to supply the cooling fluid. For instance, in some example embodiments, if the vehicle velocity is above the threshold velocity, the temperature of the camera housing may need to exceed the threshold temperature by more than a predetermined value (or vice versa) before the cooling fluid is supplied. In some example embodiments, if the temperature is below the threshold temperature by an amount x, then the vehicle velocity may need to be lower than the threshold velocity by an amount kx, where k is a multiplicative factor that can take on any real number value greater than 1, or vice versa.

In some example embodiments, the overheating protection analysis engine 308 may evaluate patterns/trends present in the temperature data and/or vehicle velocity data to determine whether the level of vulnerability of the camera housing exceeds the threshold level, and thus, whether the cooling fluid should be supplied to the camera housing from the apparatus 316. In some example embodiments, the overheating protection analysis engine 308 may analyze sensor data 304 received over a period of time (e.g., at least a portion of the time period between time $t_0$ and time $t_1$) to determine whether any temperature and/or vehicle velocity trends are present. For instance, if the temperature is continuously trending upwards but has not reached a level that exceeds the threshold temperature, the overheating protection analysis engine 308 may nonetheless issue a control decision 310 to initiate the supply of the cooling fluid in anticipation that the temperature will be exceed the threshold temperature in the near future. The engine 308 may similarly evaluate the vehicle velocity data to determine if any similar trends are present in that data. For instance, if the velocity data indicates that the vehicle 302 is continuously decelerating, the engine 308 may predict that the velocity of the vehicle 302 will be below the threshold velocity in the near future, and as a result, may issue a control decision 310 to proactively initiate the supply of the cooling fluid.

In other example embodiments, rather than triggering the supply of the cooling fluid when the temperature of the camera housing exceeds the threshold temperature value, the supply of the cooling fluid may be triggered when the temperature is within X % of the threshold temperature. Similarly, in some example embodiments, the supply of the cooling fluid may be triggered when the vehicle velocity is within Y % of the threshold velocity. In some other example embodiments, the flow rate or ejection velocity of the cooling fluid may be a function of how close the temperature or the vehicle velocity is to the threshold temperature or threshold velocity, whichever the case may be. For instance, the flow rate or ejection velocity of the cooling fluid may be at a maximum permissible level if the temperature exceeds the threshold temperature and/or the vehicle velocity is below the threshold velocity. Then, for any temperature value less than the threshold temperature, the reduction in the maximum permissible level of the flow rate or ejection velocity may be proportional to the difference between the temperature and the threshold temperature. For instance, if the temperature is 20% percent less than the threshold temperature, then the flow rate or ejection velocity may be 80% of the maximum permissible level. Similarly, for any vehicle velocity above the threshold velocity, the reduction in the maximum permissible level of the flow rate or ejection velocity may be proportional to the difference between the vehicle velocity and the threshold velocity. For instance, if the vehicle velocity is 20% percent above the threshold velocity, then the flow rate or ejection velocity may be 80% of the maximum permissible level.

Still referring to FIG. 3, the vehicle 302 may continue travelling from time $t_1$ to a later time $t_2$. During the time period between time $t_1$ and time $t_2$, the cooling fluid may be supplied from the apparatus 316 to an exterior surface of the camera housing to cool the housing. During this time, the overheating protection analysis engine 308 may continue to receive sensor data from the sensors 304 at block 402 of the method 400. In particular, the engine 308 may receive sensor data 318 instantaneously captured by the sensors 304 at time $t_2$ or captured over some portion of the period of time between time $t_1$ and time $t_2$. The engine 308 may evaluate the sensor data 318 at block 404 of the method 400 to determine an updated level of vulnerability of the camera housing to overheating.

Then, at block 406 of the method 400, the engine 308 may determine whether the updated level of vulnerability of the camera housing to overheating exceeds the threshold level of vulnerability. In response to a positive determination at block 406, the engine 308 may issue a control decision to the engine 312 indicating that the supply of the cooling fluid should be continued, and in response, the engine 312 may continue to issue the ON control signal 314 to the apparatus 316. In response to a negative determination at block 406, however, the engine 308 may issue a control decision 320 indicating to the engine 312 that the supply of the cooling fluid should be ceased. In response, the engine 312 may send an OFF control signal 322 to the apparatus 316 causing the supply of the cooling fluid from the apparatus 316 to be ceased.

In example embodiments, the engine 308 may evaluate parameters such as a temperature associated with the camera housing and/or a velocity of the vehicle 302, as determined from the sensor data 318, to determine the updated level of vulnerability of the camera housing to overheating at block 404. As previously described, at or around time $t_1$, the temperature of the camera housing may have been determined to be above the threshold temperature and/or the velocity of the vehicle 302 may have been determined to be below the threshold velocity. As a result, the engine 308 may have issued the control decision 310, based on which, the supply of the cooling fluid may have been initiated from the apparatus 316 in response to an ON control signal 314 sent by the engine 312. The sensor data 318 captured at or around time $t_2$, however, may now indicate to the engine 308 that the temperature has dropped below the threshold temperature and/or that the velocity of the vehicle 302 has risen above the threshold velocity, in which case, the engine 308 may issue the control decision 320 instructing the engine 312 to send an OFF control signal 322 to the apparatus 316 to cease the supply of the cooling fluid to the camera housing. Alternatively, if any of the alternative conditions described above for initiating (or continuing the supply of the cooling fluid) cease to be met, then engine 308 may similarly issue the control decision 320, based on which, the engine 312 may send the OFF control signal 322 to the apparatus 316 to cease the supply of the cooling fluid.

In some example embodiments, other sensor data beyond temperature data and vehicle velocity data may be evaluated to determine whether to initiate (or continue) or cease the supply of a cooling fluid from the apparatus 316. For instance, the sensor data 306, 318 may include moisture data received from a moisture sensor, which may be one of the sensors 304. The moisture sensor may measure an amount of moisture present on or in an immediate vicinity of the camera housing. In some example embodiments, the supply of the cooling fluid may be ceased (or not initiated) if the moisture data indicates that the amount of moisture on or around the camera housing exceeds a threshold moisture level. In particular, a high level of moisture associated with the camera housing such as that which would result from rain may provide a natural cooling effect to the camera housing, obviating the need for the supply of the cooling fluid.

Hardware Implementation

FIG. 5 is a schematic block diagram illustrating an example networked architecture 500 configured to implement example embodiments of the invention. The networked architecture 500 can include one or more special-purpose computing devices 502 communicatively coupled via one or more networks 506 to various sensors 504 and other vehicle systems 528. In example embodiments, the sensors 504 may include any of the example types of on-board vehicle sensors previously described including, without limitation, LiDAR sensors, radars, cameras, GPS receivers, sonar-based sensors, IMUs, accelerometers, gyroscopes, magnetometers, FIR sensors, and so forth. The special-purpose computing device(s) 502 may include devices that are integrated with a vehicle and may receive sensor data from the sensors 504 via a local network connection (e.g., WiFi, Bluetooth, Dedicated Short Range Communication (DSRC), or the like). In other example embodiments, the special-purpose computing device(s) 502 may be provided remotely from a vehicle and may receive the sensor data from the sensors 504 via one or more long-range networks. The vehicle system(s) 528 may include any of example overheating protection apparatuses described herein. Further, the vehicle system(s) 528 may additionally include an in-vehicle infotainment system or other mechanical and/or electrical systems of a vehicle.

The special-purpose computing device(s) 502 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 502 may also combine custom hard-wired logic, ASICs, or FPGAs with custom programming to accomplish the techniques. The special-purpose computing device(s) 502 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 520, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 502 may be controlled by a proprietary operating system. The operating system software 520 may control and schedule computer processes for execution; perform memory management; provide file system, networking, and I/O services; and provide user interface functionality, such as a graphical user interface ("GUI").

While the computing device(s) 502, the sensors 504, and/or the vehicle system(s) 528 may be described herein in the singular, it should be appreciated that multiple instances of any such component can be provided and functionality described in connection any particular component can be distributed across multiple instances of such a component. In certain example embodiments, functionality described herein in connection with any given component of the architecture 500 can be distributed among multiple components of the architecture 500. For example, at least a portion of functionality described as being provided by a computing device 502 may be distributed among multiple such computing devices 502.

The network(s) 506 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 506 can have any suitable communication range associated therewith and can include, for example, global networks (e.g., the Internet), metropolitan area networks (MANs), wide area networks (WANs), local area networks (LANs), or personal area networks (PANs). In addition, the network(s) 506 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 can include one or more processors (processor(s)) 508, one or more memory devices 510 (generically referred to herein as memory 510), one or more input/output ("I/O") interface(s) 512, one or more network interfaces 514, and data storage 518. The computing device 502 can further include one or more buses 516 that functionally couple various components of the computing device 502. The computing device 502 may also include various engines including an overheating protection control engine 524 and an overheating protection analysis engine 526. These engines may be implemented in any combination of software, hardware, or firmware. While these engines are illustratively depicted as software/firmware modules stored in the data storage 518, it should be appreciated that the engines may include hard-wired logic, customized logic of a persistently programmed customized computing device such as an ASIC or FPGA, or the like. Each of the engines may include logic for performing any of the processes and tasks described earlier in connection with correspondingly named engines depicted in FIG. 3.

The bus(es) 516 can include at least one of a system bus, a memory bus, an address bus, or a message bus, and can permit the exchange of information (e.g., data (including computer-executable code), signaling, etc.) between various components of the computing device 502. The bus(es) 516 can include, without limitation, a memory bus or a memory controller, a peripheral bus, an accelerated graphics port, and so forth. The bus(es) 516 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 510 can include multiple different types of memory such as various types of static random access memory (SRAM), various types of dynamic random access memory (DRAM), various types of unalterable ROM, and/or writeable variants of ROM such as electrically erasable programmable read-only memory (EE- PROM), flash memory, and so forth. The memory 510 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 518 can include removable storage and/or non-removable storage including, but not limited to, magnetic storage, optical disk storage, and/or tape storage. The data storage 518 can provide non-volatile storage of computer-executable instructions and other data. The memory 510 and the data storage 518, removable and/or non-removable, are examples of computer-readable storage media (CRSM) as that term is used herein. The data storage 518 can store computer-executable code, instructions, or the like that can be loadable into the memory 510 and executable by the processor(s) 508 to cause the processor(s) 508 to perform or initiate various operations. The data storage 518 can additionally store data that can be copied to memory 510 for use by the processor(s) 508 during the execution of the computer-executable instructions. Moreover, output data generated as a result of execution of the computer-executable instructions by the processor(s) 508 can be stored initially in memory 510 and can ultimately be copied to data storage 518 for non-volatile storage.

More specifically, the data storage 518 can store one or more operating systems (O/S) 520 and one or more database management systems (DBMS) 522 configured to access the memory 510 and/or one or more external datastore(s) potentially via one or more of the networks 506. In addition, the data storage 518 may further store one or more program modules, applications, engines, computer-executable code, scripts, or the like. For instance, any of the engines described herein may be implemented as software and/or firmware that includes computer-executable instructions (e.g., computer-executable program code) loadable into the memory 510 for execution by one or more of the processor(s) 508 to perform any of the techniques described herein.

Although not depicted in FIG. 5, the data storage 518 can further store various types of data utilized by engines of the computing device 502. Such data may include, without limitation, sensor data, map data, signal characteristic data, location data, or the like. Any data stored in the data storage 518 can be loaded into the memory 510 for use by the processor(s) 508 in executing computer-executable program code. In addition, any data stored in the data storage 518 can potentially be stored in one or more external datastores that are accessible via the DBMS 522 and loadable into the memory 510 for use by the processor(s) 508 in executing computer-executable instructions/program code.

The processor(s) 508 can be configured to access the memory 510 and execute computer-executable instructions/program code loaded therein. For example, the processor(s) 508 can be configured to execute computer-executable instructions/program code of the various program modules to cause or facilitate various operations to be performed in accordance with one or more embodiments of the invention. The processor(s) 508 can include any suitable processing unit capable of accepting data as input, processing the input data in accordance with stored computer-executable instructions, and generating output data. The processor(s) 508 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 can be made capable of supporting any of a variety of instruction sets.

Referring now to other illustrative components depicted as being stored in the data storage 518, the O/S 520 can be loaded from the data storage 518 into the memory 510 and can provide an interface between other application software executing on the computing device 502 and hardware resources of the computing device 502. More specifically, the O/S 520 can include a set of computer-executable instructions for managing hardware resources of the computing device 502 and for providing common services to other application programs. In certain example embodiments, the O/S 520 can include or otherwise control execution of one or more of the program modules stored in the data storage 518. The O/S 520 can include any operating system now known or which can be developed in the future including, but not limited to, any server operating system, any mainframe operating system, or any other proprietary or non-proprietary operating system.

The DBMS 522 can be loaded into the memory 510 and can support functionality for accessing, retrieving, storing, and/or manipulating data stored in the memory 510, data stored in the data storage 518, and/or data stored in external datastore(s). The DBMS 522 can use any of a variety of database models (e.g., relational model, object model, etc.) and can support any of a variety of query languages. The DBMS 522 can access data represented in one or more data schemas and stored in any suitable data repository. Datastore(s) that may be accessible by the computing device 502 via the DBMS 522, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 502, the input/output (I/O) interface(s) 512 can facilitate the receipt of input information by the computing device 502 from one or more I/O devices as well as the output of information from the computing device 502 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 502 or can be separate therefrom. The I/O devices can further include, for example, any number of peripheral devices such as data storage devices, printing devices, and so forth.

The I/O interface(s) 512 can also include an interface for an external peripheral device connection such as universal serial bus (USB), FireWire, Thunderbolt, Ethernet port or other connection protocol that can connect to one or more networks. The I/O interface(s) 512 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 can further include one or more network interfaces 514 via which the computing device 502 can communicate with any of a variety of other systems, platforms, networks, devices, and so forth. The network interface(s) 514 can enable communication, for example, with the sensors 504 and/or one or more other devices via one or more of the network(s) 506. In example embodiments, the network interface(s) 514 provide a two-way data communication coupling to one or more network links that are connected to one or more of the network(s) 506. For example, the network interface(s) 514 may include an integrated services digital network (ISDN) card, a cable modem, a satellite modem, or a modem to provide a data communication connection to a corresponding type of telephone line. As another non-limiting example, the network interface(s) 514 may include a local area network (LAN) card to provide a data communication connection to a compatible LAN (or a wide area network (WAN) component to communicate with a WAN). Wireless links may also be implemented. In any such implementation, the network interface(s) 514 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 504 and the signals on network links and through the network interface(s) 514, which carry the digital data to and from the computing device 502, are example forms of transmission media. In example embodiments, the computing device 502 can send messages and receive data, including program code, through the network(s) 506, network links, and network interface(s) 514. For instance, in the Internet example, a server might transmit a requested code for an application program through the Internet, the ISP, a local network, and a network interface 514. The received code may be executed by a processor 508 as it is received, and/or stored in the data storage 518, or other non-volatile storage for later execution.

It should be appreciated that the engines depicted in FIG. 5 as part of the computing device 502 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 502 and/or hosted on other computing device(s) accessible via one or more of the network(s) 506, can be provided to support functionality provided by the engines depicted in FIG. 5 and/or additional or alternate functionality. In addition, engines that support functionality described herein can be implemented, at least partially, in hardware and/or firmware and can be executable across any number of computing devices 502 in accordance with any suitable computing model such as, for example, a client-server model, a peer-to-peer model, and so forth.

It should further be appreciated that the computing device 502 can include alternate and/or additional hardware, software, and/or firmware components beyond those described or depicted without departing from the scope of the invention. More particularly, it should be appreciated that software, firmware, and/or hardware components depicted as forming part of the computing device 502 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) XXX. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. An apparatus for protecting a sensor housing from overheating, the apparatus comprising:
    a protective shield configured to reduce heat exposure for an exterior surface of the sensor housing and protect the exterior surface from direct sun exposure; and
    a second component configured to supply a fluid to a space between the first component and the exterior surface of the sensor housing.

2. The apparatus of claim 1, wherein the second component is a tube comprising an inlet at one end for receiving the fluid and one or more nozzles at an opposing end for ejecting the fluid into the space between the first component and the exterior surface of the sensor housing.

3. The apparatus of claim 2, wherein the one or more nozzles are adjustable to direct the fluid to different portions of the exterior surface of the sensor housing.

4. The apparatus of claim 2, wherein the tube extends through an interior of the sensor housing.

5. The apparatus of claim 2, wherein the tube extends around an exterior of the sensor housing.

6. The apparatus of claim 1, wherein the sensor housing encloses one or more cameras and comprises one or more corresponding transparent surfaces to provide the one or more cameras with a field-of-view of an external environment.

7. The apparatus of claim 6, further comprising one or more drainage channels for directing the fluid supplied to the space between the first component and the exterior surface of the sensor housing away from the one or more transparent surfaces.

8. The apparatus of claim 1, wherein the fluid is air or water.

9. The apparatus of claim 1, further comprising a controller configured to selectively supply the fluid to the space between the first component and the exterior surface of the sensor housing based at least in part on a temperature of or around the sensor housing and a velocity of a vehicle in connection with which the apparatus is provided.

10. A computer-implemented method for selectively controlling an apparatus for protecting a sensor housing from overheating, the method comprising:
    receiving sensor data;
    analyzing the sensor data to determine a level of vulnerability of the sensor housing to overheating;
    determining that the level of vulnerability exceeds a threshold level; and
    controlling the apparatus to supply a fluid to lower a temperature of the sensor housing.

11. The computer-implemented method of claim 10, wherein the apparatus comprises a first component configured to reduce heat exposure for an exterior surface of the sensor housing and a second component configured to supply the fluid to a space between the first component and the exterior surface of the sensor housing.

12. The computer-implemented method of claim 11, wherein the first component is a protective shield that protects the exterior surface of the sensor housing from direct sun exposure and the second component is a tube comprising an inlet at one end for receiving the fluid and one or more nozzles at an opposing end for ejecting the fluid into the space between the protective shield and the exterior surface of the sensor housing.

13. The computer-implemented method of claim 12, wherein controlling the apparatus comprises sending a control signal to initiate the intake of the fluid at the inlet of the tube.

14. The computer-implemented method of claim 13, wherein controlling the apparatus further comprises adjusting the one or more nozzles to direct to the fluid to different portions of the exterior surface of the sensor housing.

15. The computer-implemented method of claim 10, wherein the sensor data comprises at least one of temperature data or velocity data for a vehicle.

16. The computer-implemented method of claim 15, wherein analyzing the sensor data to determine the level of vulnerability of the sensor housing to overheating comprises:
- determining a temperature of the sensor housing based at least in part on the temperature data;
- determining that the temperature exceeds a threshold temperature;
- determining, based at least in part on the velocity data, that a velocity of the vehicle is below a threshold velocity; and
- determining the level of vulnerability of the sensor housing to overheating based at least in part on the temperature exceeding the threshold temperature and the velocity of the vehicle being below the threshold velocity.

17. The computer-implemented method of claim 16, wherein the temperature of the sensor housing is a first temperature during a first period of time, the method further comprising:
- determining a second temperature of the sensor housing during a second period of time based at least in part on the temperature data;
- determining that the second temperature is below the threshold temperature;
- determining, based at least in part on the second temperature being below the threshold temperature, that the level of vulnerability of the sensor housing to overheating is below the threshold level; and
- controlling the apparatus to cease the supply of the fluid.

18. The computer-implemented method of claim 16, wherein the velocity of the vehicle is a first velocity of the vehicle during a first time period, the method further comprising:
- determining a second velocity of the vehicle during a second period of time based at least in part on the velocity data;
- determining that the second velocity of the vehicle is above the threshold velocity;
- determining, based at least in part on the second velocity of the vehicle being above the threshold velocity, that the level of vulnerability of the sensor housing to overheating is below the threshold level; and
- controlling the apparatus to cease the supply of the fluid.

19. The computer-implemented method of claim 10, wherein the sensor data comprises environmental moisture data, the method further comprising:
- determining, based at least in part on the environmental moisture data, an amount of moisture on the sensor housing;
- determining that the amount of moisture exceeds a threshold amount of moisture;
- determining, based at least in part the amount of moisture exceeding the threshold amount of moisture, that the level of vulnerability of the sensor housing to overheating is below the threshold level; and
- controlling the apparatus to cease the supply of the fluid.

20. An apparatus for protecting a sensor housing from overheating, the apparatus comprising:
- a first component configured to reduce heat exposure for an exterior surface of the sensor housing; and
- a tube that extends through an interior of the sensor housing and comprises an inlet at one end for receiving a fluid and one or more nozzles at an opposing end for ejecting the fluid into a space between the first component and the exterior surface of the sensor housing.

\* \* \* \* \*